March 4, 1924.
C. F. PORTER
DOOR HOLDER
Filed Sept. 12, 1921
1,485,466
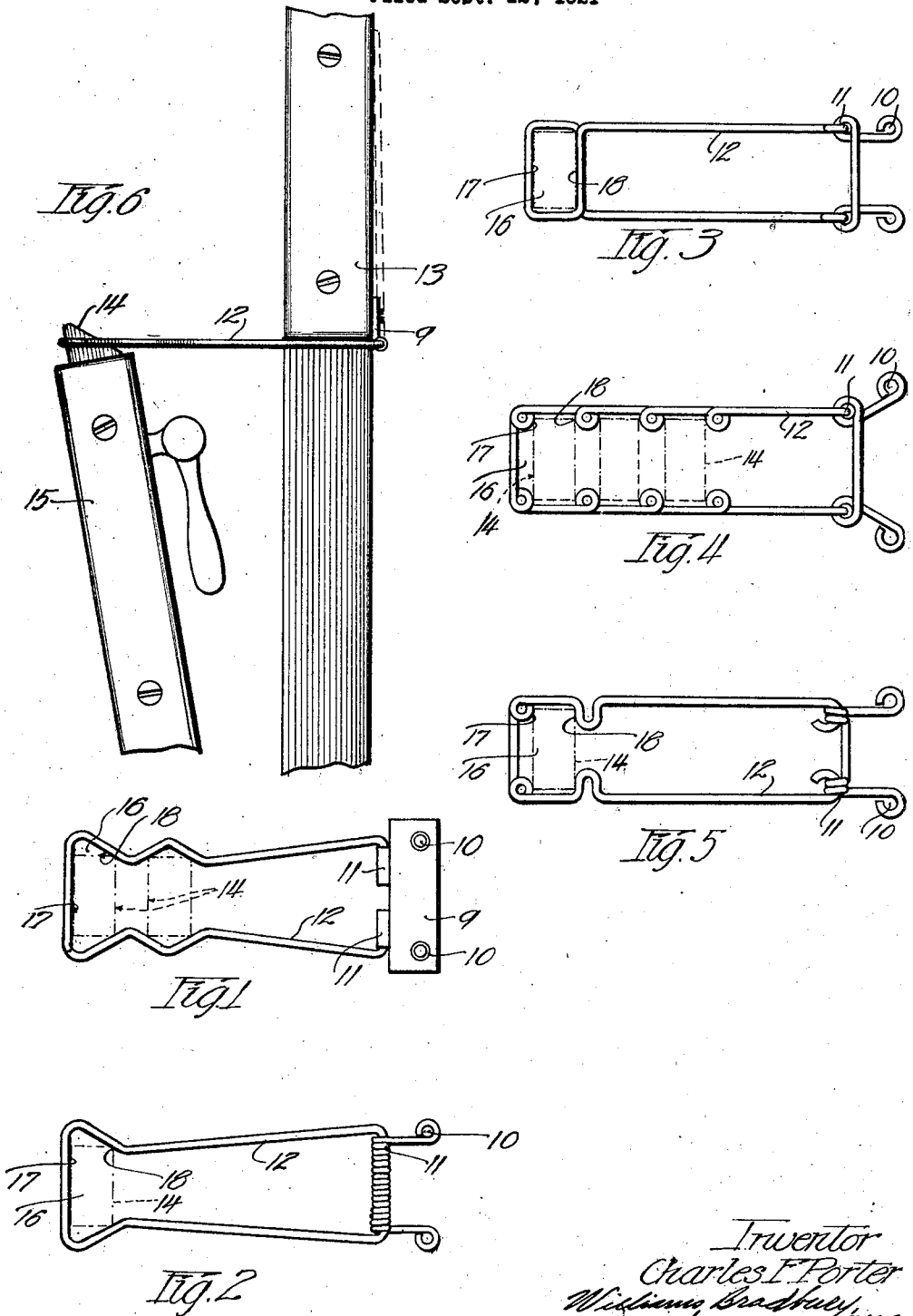

Patented Mar. 4, 1924.

1,485,466

UNITED STATES PATENT OFFICE.

CHARLES F. PORTER, OF CHICAGO, ILLINOIS; SARAH HARRIET PORTER EXECUTRIX OF SAID CHARLES F. PORTER, DECEASED.

DOOR HOLDER.

Application filed September 12, 1921. Serial No. 500,242.

*To all whom it may concern:*

Be it known that I, CHARLES F. PORTER, a citizen of the United States, residing at Chicago, in the county of Cook and State of Illinois, have invented a certain new and useful Improvement in Door Holders, of which the following is a full, clear, concise, and exact description, reference being had to the accompanying drawings, forming a part of this specification.

My invention relates to a device for holding doors in a fixed open position, and is especially intended for use in connection with automobile doors. The device is attached within the automobile body and comprises a stationary member and a hinged member arranged to be swung inwardly when not in use, and to swing outwardly to co-operate with the door latch to hold the door in a fixed open position to permit ventilation of the inside of the automobile.

The objects of the invention are—

First, to provide a device which will hold a door in a fixed open position and to prevent its vibration;

Second, to provide means to permit the opening of the door to any desired degree, and holding the same in that position;

Third, to provide a device which may be very economically manufactured.

Economy of manufacture may be secured by the use of stiff wire, and numerous designs are permitted as shown in the drawings, in which—

Figure 1 is a view in elevation of the preferred form of my invention,

Figures 2 to 5 inclusive are illustrations of modified forms of the device, and

Figure 6 is a view showing the attachment in place on an automobile body, the door being held in open position.

Similar characters of reference are used throughout the several views.

The preferred form of my device illustrated in Figure 1 comprises a stationary member 9, in this case being a hinge leaf provided with apertures 10—10 to receive screws whereby the leaf may be secured to the automobile body. Extending into the hinge leaf at 11—11 are the free ends of a substantially U-shaped retaining member 12 of any suitable material such as still wire. In use, the stationary member 9 is secured to the automobile body 13 as illustrated in Figure 6 in the position illustrated to permit the retaining member 12 to be swung inwardly and out of the way when not in use, and to be swung outwardly to co-operate with the latch member 14 of the automobile body 15. The U-shaped member 12 is provided with one or more sections 16 which are arranged to receive the latch 14.

When it is desired to hold the automobile door in open position, it is swung outwardly and the member 12 is swung to the position shown in full lines in Figure 6. The door is then brought inwardly so that the latch member snaps into the section 16 which provides abutments to embrace and engage the latch to prevent the door from vibrating. I prefer to construct the device so that the latch member engages the faces 17 and 18 of the sections 16 as indicated in Figure 6. The door, of course, may be drawn inwardly so that the latch member snaps into successive sections 16 as desired.

In the form illustrated in Figure 1, two of the sections 16 are illustrated to receive the latch 14 and to permit holding the door in different open positions. When attached to the automobile body, the stationary member 9 is so secured that the member 12 engages the automobile body to provide resilient engagement therewith when engaged by the door latch.

Figures 2, 3 and 5 illustrate devices for holding the door in but one position and are alternate forms of the device, each embodying the idea of a fixed member attached to the automobile body and a retaining member adapted to receive and embrace the latch member of the automobile door. Figure 4 illustrates the device provided with a plurality of sections to receive and hold the door latch.

Having thus described my invention, what I claim is new and desire to secure by Letters Patent of the United States is:

1. In combination with a door frame, a door and a latch bolt thereon, a latch bolt retaining device comprising a flat fastening member, said fastening member being secured to the door frame, and a flat latch receiving member, said two members having hinged relation whereby to lie in substantially the same plane, said latch receiving member being substantially U-shaped in form and having opposing restrictions in each arm to provide means adjacent which the latch bolt is adapted to be received and engaged within the U.

2. A latch retaining device comprising a flat fastening member, and a latch bolt receiving member in hinged relation to the fastening member whereby the two members may lie in substantially the same plane, said latch bolt receiving member being substantially U-shaped and having in each arm thereof a restriction to provide means adjacent which a latch bolt may be received and engaged within the U, said restrictions opposing each other.

In witness whereof, I hereunto subscribe my name this 31st day of August, 1921.

CHARLES F. PORTER.

Witnesses:
ALBIN C. AHLBERG,
EMILE BOURGEOIS.